(12) United States Patent
Yoshida (10) Patent No.: US 11,607,763 B2
(45) Date of Patent: Mar. 21, 2023

(54) AUTOMATIC PALLET CHANGER IN MACHINE TOOL

(71) Applicant: OKUMA CORPORATION, Niwa-gun (JP)

(72) Inventor: Makoto Yoshida, Niwa-gun (JP)

(73) Assignee: OKUMA CORPORATION, Niwa-gun (JP)

( * ) Notice: Subject to any disclaimer, the term of this patent is extended or adjusted under 35 U.S.C. 154(b) by 265 days.

(21) Appl. No.: 17/017,908

(22) Filed: Sep. 11, 2020

(65) Prior Publication Data

US 2021/0078124 A1 Mar. 18, 2021

(30) Foreign Application Priority Data

Sep. 13, 2019 (JP) .............................. JP2019-167466

(51) Int. Cl.
*B23Q 7/14* (2006.01)
*B23Q 7/10* (2006.01)
*B23Q 5/34* (2006.01)

(52) U.S. Cl.
CPC ............ *B23Q 7/1431* (2013.01); *B23Q 5/34* (2013.01); *B23Q 7/10* (2013.01); *Y10T 29/5196* (2015.01)

(58) Field of Classification Search
CPC ............ Y10T 29/5196; Y10T 29/5124; Y10T 409/30532; Y10T 409/305432; Y10T 409/306048; Y10T 409/306104; Y10T 483/16; Y10T 483/165; B23Q 7/1431; B23Q 7/10; B23Q 7/1426–7/1494; B23Q 1/66; B25J 9/041; Y10S 901/17

USPC ......... 29/33 P, 563; 409/159, 161, 172, 173; 483/14–15; 198/345.3, 346.1; 901/17

See application file for complete search history.

(56) References Cited

U.S. PATENT DOCUMENTS

| 4,642,212 A * | 2/1987 | Bailey ...................... B25J 19/00 29/527.3 |
| 4,781,512 A * | 11/1988 | Ohta .................... B23Q 7/1431 414/280 |
| 5,107,581 A * | 4/1992 | Reuter ............... B23Q 3/15536 483/62 |
| 5,222,285 A * | 6/1993 | Horikawa ............ B23Q 7/1494 414/223.01 |
| 5,281,194 A * | 1/1994 | Schneider ............... B23Q 7/046 483/62 |
| 7,153,252 B2 * | 12/2006 | Luscher ................. B23Q 7/046 483/62 |

(Continued)

FOREIGN PATENT DOCUMENTS

| DE | 202011001493 U1 * | 5/2011 | ............. B23Q 1/015 |
| DE | 202011104037 U1 * | 3/2012 | ............. B08B 1/04 |

(Continued)

*Primary Examiner* — Erica E Cadugan
(74) *Attorney, Agent, or Firm* — Locke Lord LLP (57) ABSTRACT

Provided is an automated pallet changer in machine tool which enable miniaturization and cost reduction. A drive unit in the automatic pallet changer includes a planetary reduction gear. The planetary reduction gear has a first output shaft and a second output shaft in which, by fixing one of the first and second output shaft, the other functions as an output shaft for driving. The first output shaft is used to pivot the pivoting frame, and the second output shaft is used to move the carry-in/out arm back and forth.

5 Claims, 6 Drawing Sheets

(56) References Cited

U.S. PATENT DOCUMENTS

| | | | |
|---|---|---|---|
| 7,721,398 B2 * | 5/2010 | Bernhard | B23Q 1/66 409/172 |
| 10,882,151 B2 * | 1/2021 | Yoshida | B23Q 7/1431 |
| 2010/0307300 A1 * | 12/2010 | Kuriya | B23Q 7/1431 82/125 |
| 2012/0255833 A1 * | 10/2012 | Ryu | B23Q 1/262 198/465.1 |
| 2012/0257950 A1 * | 10/2012 | Mattern | B23Q 7/10 414/223.01 |
| 2014/0371042 A1 * | 12/2014 | Bernhard | B23Q 3/15773 483/1 |

FOREIGN PATENT DOCUMENTS

| | | | |
|---|---|---|---|
| DE | 102019214088 A1 * | 3/2021 | |
| JP | 63-057153 A * | 3/1988 | |
| JP | 02-012693 B2 * | 3/1990 | |
| JP | H09-309038 A | 12/1997 | |
| JP | 10-217061 A * | 8/1998 | |
| JP | 2005238358 A * | 9/2005 | |
| WO | WO-2022128451 A1 * | 6/2022 | |

\* cited by examiner

> Embodiment in which the pallet is linearly arranged, and in which the first rotating gear fixed to the first output shaft of the planetary reduction gear is engaged with a rack fixed to a base frame to linearly move a horizontal movement frame

AUTOMATIC PALLET CHANGER IN MACHINE TOOL

TECHNICAL FIELD

The present invention relates, for example, to an automatic pallet changer in a machine tool such as a machining center.

BACKGROUND ART

Machine tools, such as machining centers, are known to use pallets for mounting and supplying workpieces, and to use automatic pallet changers (APCs) for automatically replacing pallets with workpieces.
The automatic pallet changer is known not only to store the pallet in a planar manner, but also to be a three-dimensional APC in which the pallet can be stored in a three-dimensional manner (Patent Document 1).
In a three-dimensional automatic pallet changer, as a configuration for carrying in/out the required pallet to/from a pallet storage section to store pallets in a plurality of rows and stages, it is essential to have a carry-in/out arm that supports the pallet and carries in/out the pallet to/from the pallet storage section, a pivoting frame that moves in a horizontal direction to move the carry-in/out arm to a front of a predetermined row of the pallet storage section, and a lifting frame that moves in a vertical direction to move the carry-in/out arm to a front of a predetermined stage of the pallet storage section.
Conventionally, the carry-in/out arm, the pivoting frame, and the lifting frame were each driven by a different drive with a motor respectively.

CITATION LIST

Patent Literature

Patent Literature 1: Japanese Patent Application Laid-Open Publication No. 9-309038

SUMMARY OF INVENTION

Technical Problem

Although a three-dimensional automatic pallet changer has the advantage of being able to improve the efficiency of machining by the machine tool by storing a large number of pallets, there is a problem of increasing the size of the machine and incurring costs, and it is hoped that this problem will be solved.
An object of the present invention is to provide an automated pallet changer for machine tools that enables miniaturization and cost reduction.

Solution to Problem

The automatic pallet changer of the present invention includes a pallet storage section for storing pallets in multiple rows and multiple stages, a carry-in/out arm that supports the pallets and moves in the back and forth direction for carrying in/out the pallet to/from the pallet storage section, a horizontal movement frame that moves horizontally for moving the carry-in/out arm to a front of a predetermined row of the pallet storage section, a lifting frame that moves in the up and down direction for moving the carry-in/out arm to a front of a predetermined stage of the pallet storage section, and a drive unit for driving the carry-in/out arm, the horizontal movement frame, and the lifting frame. In an automatic pallet changer for machine tools that carrys the required pallet between the machine tool body and the pallet storage section, the driving device includes a planetary reduction gear having a first output shaft and a second output shaft in which, by fixing one of the first and second output shafts, the other functions as the output shaft for driving. Each of the first and second output shafts has axis in the up and down direction. One of the first and second output shafts is used to move the horizontal movement frame horizontally and the other is used to move the carry-in/out arm in the back and forth direction.

According to the automatic pallet changer in the machine tool of the present invention, a planetary reduction gear and a motor for driving the planetary reduction gear can be used to drive both the horizontal movement of the horizontal movement frame and the forward and backward movement of the carry-in/out arm, thereby miniaturization and cost reduction, compared to the conventional automatic pallet changer in which different motors are respectively used to drive the horizontal movement of the horizontal movement frame and the forward and backward movement of the carry-in/out arm, can be achieved.

A first rotating gear fixed to the first output axis of the planetary reduction gear is adapted to move integrally with the horizontal movement frame and is engaged with a fixed gear or a rack fixed to a base frame, so that when the first rotating gear rotates, the first rotating gear and the horizontal movement frame may move horizontally together.

A second rotating gear fixed to a second output shaft of a planetary reduction gear is engaged with a third rotating gear fixed to a spline shaft having an axis in the up and down direction, a pinion gear is integrally disposed around the outer periphery of the spline nut fitted to the spline shaft, a rack, which is engaged to the pinion gear and extends in the back and forth direction, is fixed to the carry-in/out arm, and when the second rotating gear rotates, the third rotating gear, the spline shaft, the spline nut and the pinion gear rotate integrally, and the rack and the carry-in/out arm may move forward and backward together.

The means for fixing the first output shaft may be formed by a piston that is supported by the horizontal moving frame in a horizontally movable manner and a piston inlet hole that is provided in a block fixed to the base frame and into which the piston tip is fitted.

Preferably, the means for fixing the second output shaft is formed by a piston that is supported movably in the up and down direction by a casing which supports the planetary reduction gear and a piston inlet hole that is provided in a second rotating gear and into which the piston tip is fitted.

Advantageous Effect of Invention

According to the automatic pallet changer in the machine tool of the present invention, one planetary reduction gear and one motor that drives the planetary reduction gear can be used to drive both horizontal movement of the horizontal movement frame and forward and backward movement of the carry-in/out arm, thereby miniaturization and cost reduction can be achieved.

DESCRIPTION OF EMBODIMENTS

Hereinafter, the embodiment of the automatic pallet changer of the present invention will be described with reference to the drawings. In the following description, the side where the carrying-in/out arm approaches the pallet (right side of FIG. 1) is referred to as the front side and the side away from the pallet (left side of FIG. 1) is referred to as the rear side, and the top and bottom of FIG. 2 are referred to as the vertical side.
In addition, the left and right shall be from the rear to the front.

Figure 1:
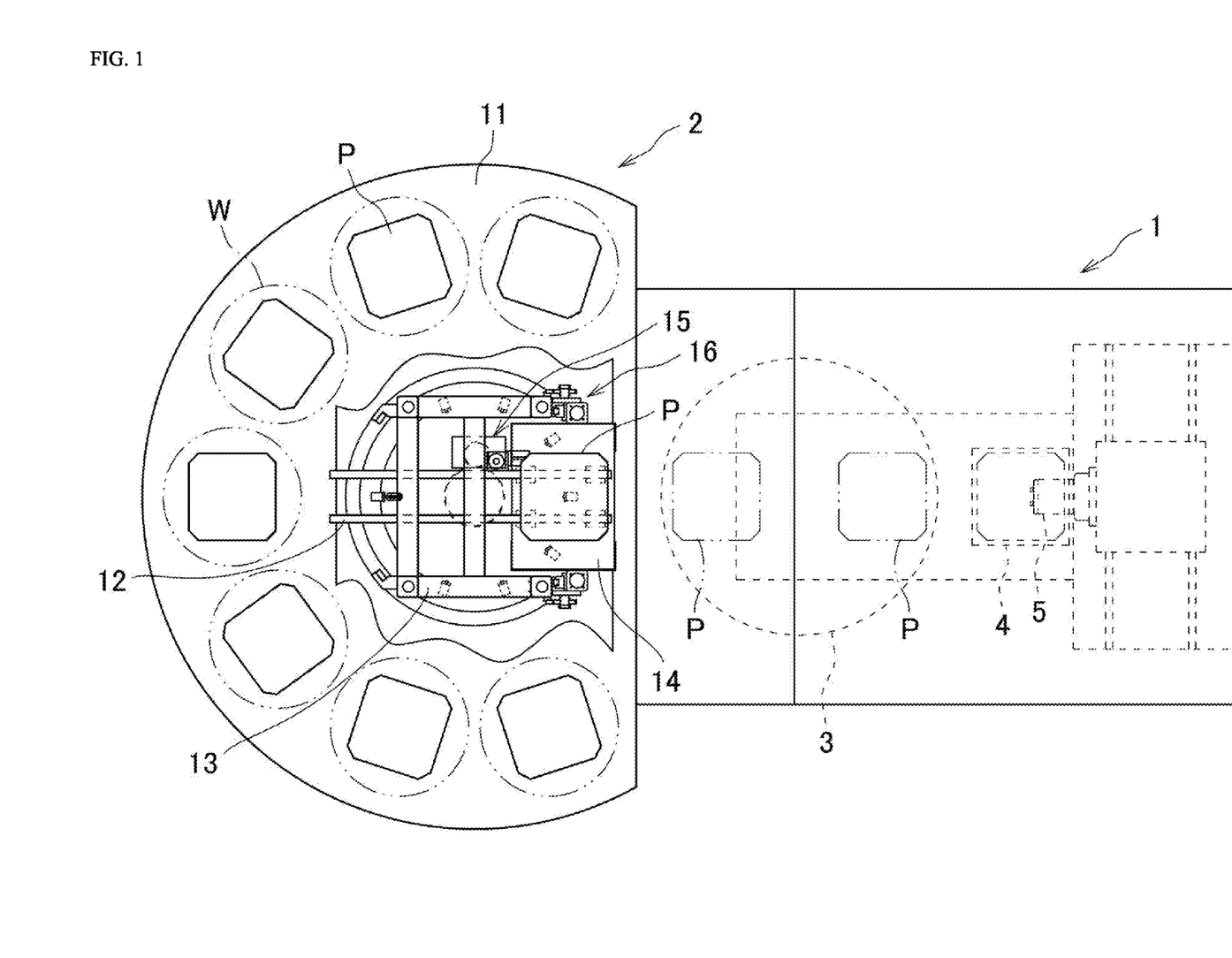
FIG. 1 is a plan view illustrating an automatic pallet changer in the machine tool of the present invention.
Figure 2:
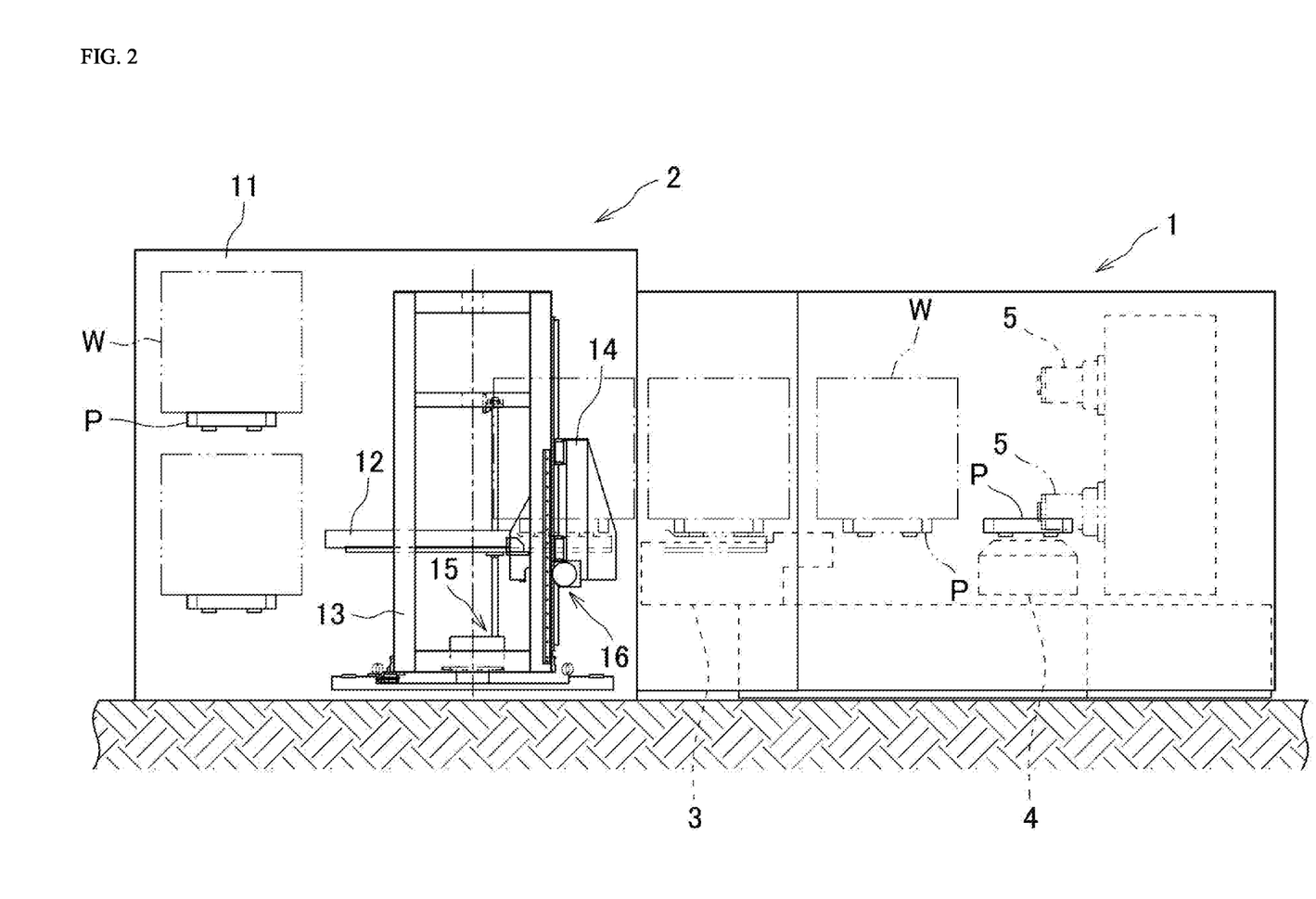
FIG. 2 is a elevational view illustrating an automatic pallet changer in a machine tool of the present invention.

FIGS. 1 and 2 schematically illustrate a machine tool body 1 and an automatic pallet changer 2 mounted on the front side of a machine tool body 1.

The machine tool body 1 is a horizontal machining center that machines a workpiece W attached to the pallet P, and includes a pallet delivery device 3, a table 4 that moves the pallet P, and a machining device 5 that machines the workpiece W.

The automatic pallet changer 2 is a three-dimensional type with a pallet storage section 11 for storing the pallets P in multiple rows in a circumferential direction and multiple stages in a vertical direction. The pallets P is carried in/out between the pallet storage section 11 and the machine tool body 1.
The pallet storage section 11 is formed so as to have a C-shape in planar view.

The automatic pallet replacement device 2 includes an carry-in/out arm 12 that supports the pallet P and carries in/out the pallet P to/from the pallet storage portion 11, a pivoting frame (horizontal movement frame) 13 that moves horizontally for moving the carry-in/out arm 12 to a front of a predetermined row of the pallet storage portion 11, a lifting frame 14 that moves in up and down direction for moving the carry-in/out arm 12 to a front of a predetermined stage of the pallet storage portion 11, a pivoting/carry-in/out drive unit (horizontally moving/carry-in/out drive unit) 15 that moves the carry-in/out arm 12 and the pivoting frame 13, and a lifting drive unit 16 that moves the lifting frame 14.

Hereinafter, the details of the automatic pallet changer 2 will be described with reference to FIGS. 3 to 5.

The automatic pallet changer 2 includes, as a fixed portion, a base frame 17, a pivot center shaft 18 fixed on the base frame 17, and a fixed gear 19 fixed concentrically on the pivot center shaft 18.

Figure 3:
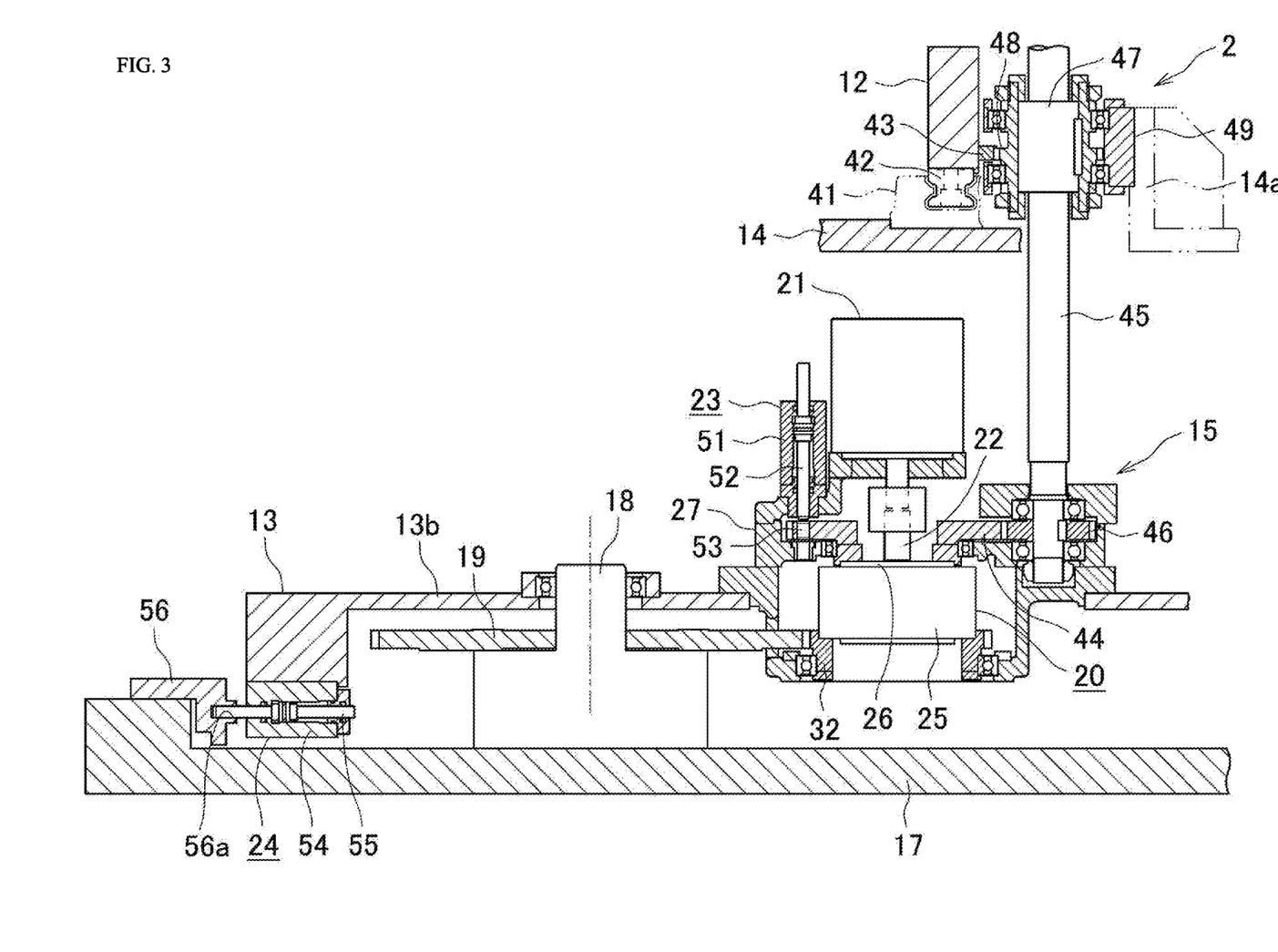
FIG. 3 is a cross-sectional view illustrating a device for driving a rotating frame and an carry-in/out arm of an automatic pallet replacement device.
Figure 4:
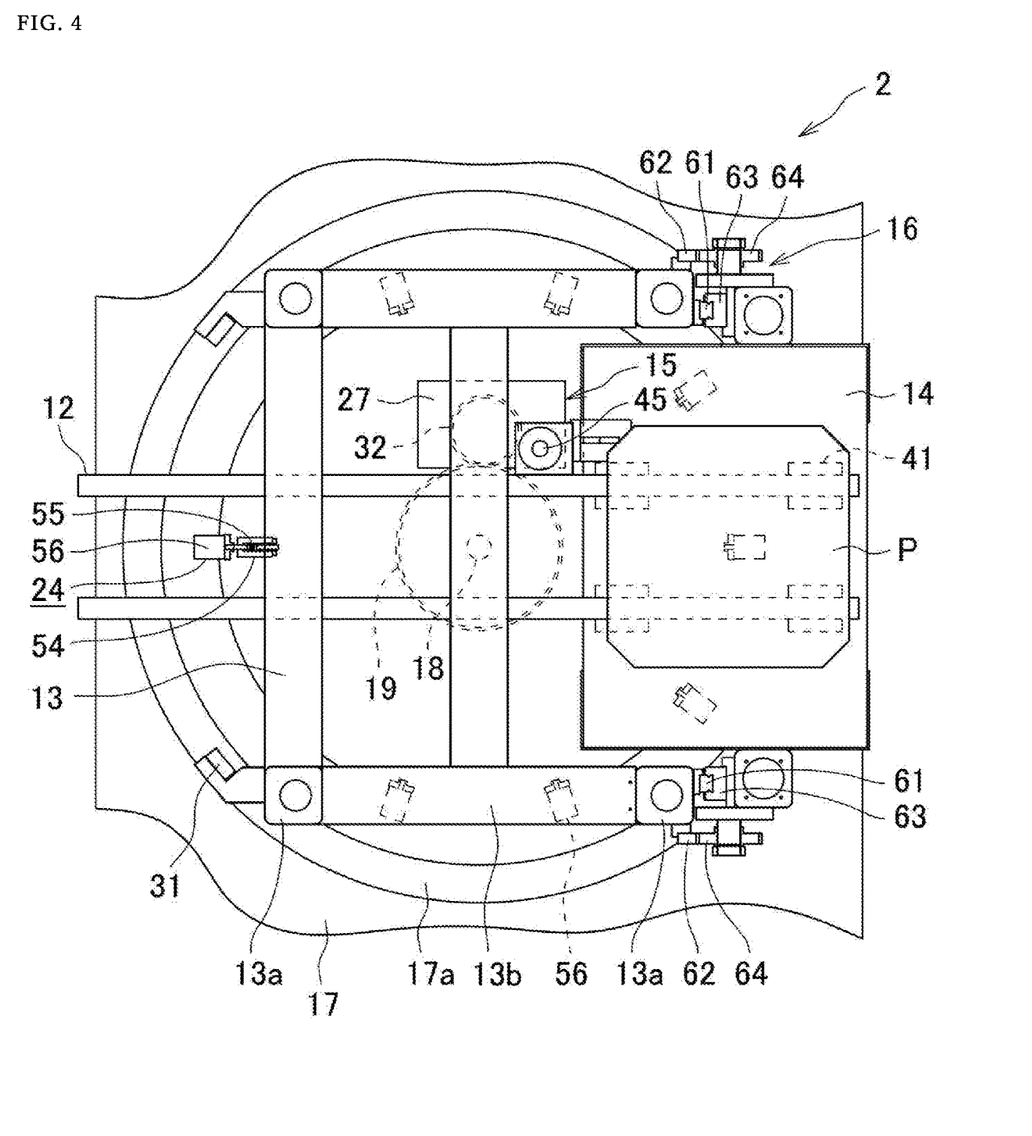
FIG. 4 is a plan view enlarging the automatic pallet changer of FIG. 1.
Figure 5:
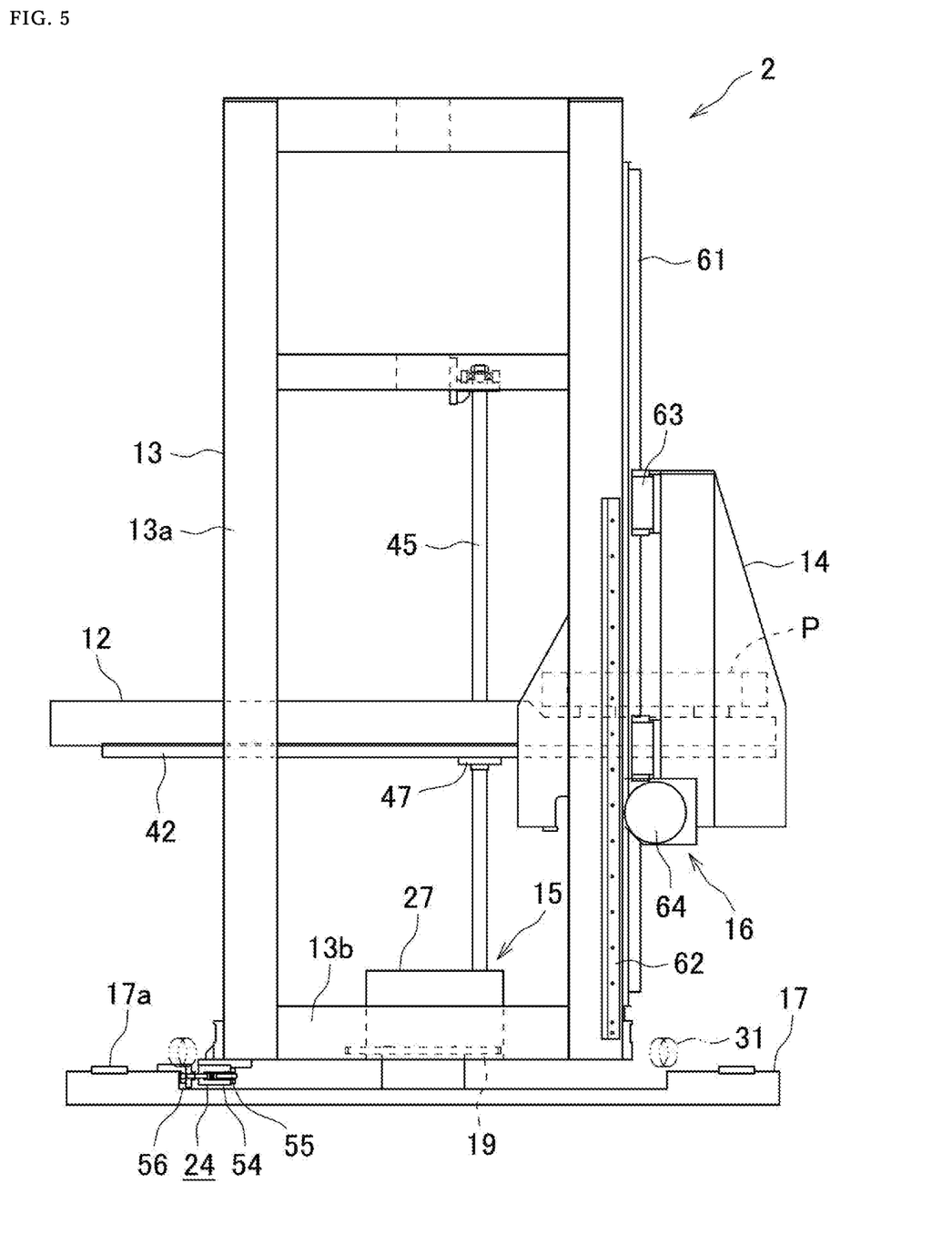
FIG. 5 is an elevational view enlarging the automatic pallet changer of FIG. 1.

The carry-in/out arm 12 consists of a pair of parallel plates extending in the forward and backward direction, and is supported movably in the forward and backward directions (from the front side to the backside or from the backside to the front side of the sheet in FIG. 3, and the left and right directions in FIGS. 4 and 5).

The pivoting frame 13 includes four longitudinal frames 13a and a transverse frame 13b that connects the upper ends and the lower ends of the four longitudinal frames 13a in a U shape in top plan view.

The lifting frame 14 is nearly U-shaped and is supported movably in the up and down direction to two longitudinal frames 13a on the front side of the pivoting frame 13.

The carry-in/out arm 12 moves in the up and down direction integrally with the lifting frame 14 and is movable in the up and down direction from a position corresponding to the bottom surface of the lowermost pallet to a position corresponding to the bottom surface of the uppermost pallet.

The pivoting/carrying-in/out drive unit 15 is configured to drive both the pivoting of the pivoting frame 13 and the forward/backward movement of the carrying-in/out arm 12, and the lifting drive unit 16 is configured to drive the lifting of the lifting frame 14.

The pivoting/carrying-in/out drive 15 includes a planetary reduction gear 20 having an input shaft 22 rotated by a motor 21 and a first output shaft 25 and a second output shaft 26, as shown in FIG. 3.

The planetary reduction gear 20, which is not shown in its internal structure, includes a solar gear, a plurality of planetary gears engaging with the solar gear and an internal gear engaging with the inner periphery of the planetary gears. The planetary reduction gear 20 is a reducer configured to reduce the high speed rotation of the motor 21 and output by the first output shaft 25 or the second output shaft 26.

The planetary reduction gear 20 can rotate the first output shaft 25 by preventing the second output shaft 26 from rotating by the first fixing means 23, and the second output shaft 26 can be rotated by preventing the first output shaft 25 from rotating by the second fixing means 24.

The motor 21 and the planetary reduction gear 20 are supported on casing 27, which is fixed to the pivoting frame 13 and rotates integrally with the pivoting frame 13.

The pivoting frame 13 is supported on the pivot center shaft 18 so that it can be rotated about the axis of the pivot center shaft 18, and can be pivoted about the axis of the pivot center shaft 18 on the trajectory plane 17a provided on the base frame 17 via a plurality of bearings 31.

The pivoting/carrying-in/out drive unit 15 includes a pivoting gear (the first rotating gear) 32 that engages the fixed gear 19 and is fixed to the first output shaft 25 of the planetary reduction gear 20 in order to rotate the rotating frame 13.
The pivoting gear 32 can pivot while rotating around the outer circumference of the fixed gear 19 when the fixation is released.

A guide rail 42 is fixed to the undersurface of the carry-in/out arm 12, and the guide rail 42 is configured to move on a guide block 41 fixed on the lifting frame 14.
A rack 43 extending in the forth and back direction is provided on the carrying-in/out arm 12.

The pivoting/carrying-in/out drive unit 15 includes a spline shaft driving gear (a second rotating gear) 44 having an axial line in the up and down direction and fixed to the second output shaft 26 of the planetary reduction gear 20 in order to move the carrying-in/out arm 12 back and forth.

A spline shaft driving gear 44 is engaged with a spline shaft driving gear 46 fitted into and fixed to the lower end portion of a spline shaft 45 extending in the up and down direction.
The spline shaft 45 is rotatably supported and is provided to extend parallel to the longitudinal frames 13a of the pivoting frame 13 through the vicinity of the carry-in/out arm 12.

In the spline shaft 45, a spline nut 47 is movably fitted in the up and down direction.

The spline nut 47 is integrally formed with a pinion gear 48 engaged with the rack 43 of the carry-in/out arm 12.

The spline nut 47 is fixed to the vertical portion 14a of the lifting frame 14 via a bracket 49, and when the lifting frame 14 moves in the up and down direction, the bracket 49, the spline nut 47, and the carry-in/out arm 12 (including the guide blocks 41, the guide rails 42, and the rack 43) are moved integrally.

The first fixing means 23 comprises a piston 52 for carrying in/out and driving which is supported movably in the up and down direction to a cylinder 51 fixed to a casing 27, and a piston inlet hole 53 which is formed in the spline shaft driving gear 44 and into which the lower end (distal end) of the piston 52 is fitted.

The second fixing means 24 comprises a piston 55 for pivoting and fixing which is supported movably left-to-right to a cylinder 54 which is fixed to a pivoting frame 13, and a block 56 which is fixed to the base frame 17 and has a piston inlet hole 56a into which the left end (distal end) of the piston 55 is fitted.

The lifting drive unit 16 includes a guide rail 61 fixed to the longitudinal frames 13a of the pivoting frame 13, a rack 62 fixed to the longitudinal frames 13a of the guide rail 61 so as to be parallel to the guide rail 61, a guide block 63 which is fixed to the lifting frame 14 and moves along the guide rail 61, and a pinion gear 64 which is rotatably engaged to the rack 62 and moves in the up and down direction integrally with the lifting frame 14.

According to the lifting drive unit 16, when the pinion gear 64 is rotated by a motor which is not shown, the pinion gear 64 moves up and down along the rack 62 so that the lifting frame 14 moves up and down relative to the pivoting frame 13.

The pivoting of the pivoting frame 13 by the pivoting/carrying-in/out drive unit 15 is performed in the following manner.

The second output shaft 26 is fixed by the first fixing means 23 and the first output shaft 25 is released from the fixation by the second fixing means 24, thereby making the pivoting gear 32 rotatable.

In this state, when the input shaft 22 is rotated by the motor 21, the pivoting gear 32 rotates and the pivoting frame 13 pivots.

With the pivoting of the pivoting frame 13, in FIG. 3, all components other than the fixing portions 17, 18, 19, and 56 are pivoted together.

The back and forth movement of the carrying-in/out arm 12 by the pivoting/carrying-in/out drive unit 15 is performed in the following manner.

The first output shaft 25 is fixed by the second fixing means 24 and the second output shaft 26 is released from the fixation by the first fixing means (23), thereby making the spline shaft drive gear 44 rotatable.

In this state, when the input shaft 22 is rotated by the motor 21, the spline shaft drive gear 44 rotates, as a result, shaft drive gear 46, the spline shaft 45, the spline nut 47, and the pinion gear 48 rotates integrally. As the pinion gear 44 rotates, the rack 43 and the carry-in/out arm 12 move back and forth integrally.

Thus, according to the pivoting/carry-in/out drive unit 15, the pivoting of the pivoting frame 13 and the back and forth movement of the carry-in/out arm 12 are driven by one motor 21 and one planetary reduction gear 20.

Here, it is understood that the lifting frame 14 by the lifting drive unit 16 can be performed simultaneously with the pivoting of the pivoting frame 13 by the pivoting/carry-in/out drive unit 15, and that the carrying-in/out arm 12 by the pivoting/carry-in/out drive unit 15 is performed after the lifting of the lifting frame 14 by the lifting drive unit 16 and the pivoting of the pivoting frame 13 by the pivoting/carrying-in/out drive unit 15 are completed.

According to the automatic pallet changer 2 described above, it is possible to drive both the pivoting of the pivoting frame 13 and the back and forth movement of the carry-in/out arm 12 by using one planetary reduction gear 20 and one motor 21 that drives the planetary reduction gear 20. Therefore, compared to the conventional automatic pallet changer that uses a motor for driving the pivoting frame 13 and a motor for driving the back and forth movement of the carry-in/out arm 12, it is possible to reduce the size of the drive section and the motor servo amplifier.

According to the automatic pallet changer in the machine tool of the present invention, one planetary reduction gear and one motor that drives the planetary reduction gear can be used to drive both horizontal movement of the horizontal movement frame and back and forth movement of the carry-in/out arm, thereby miniaturization and cost reduction can be achieved.

Figure 6:
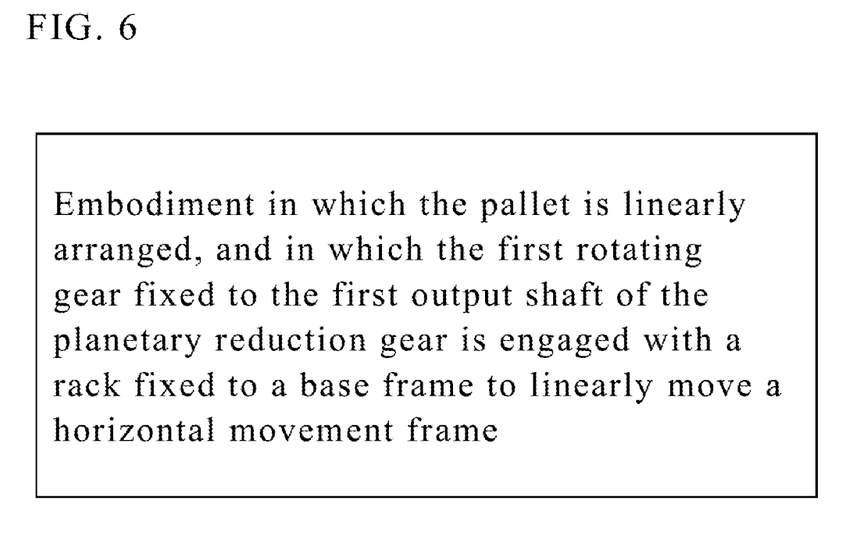
FIG. 6 schematically shows features of an alternative embodiment.

As shown schematically in FIG. 6, the above-described automatic pallet changer can be applied to a system in which the pallet is linearly arranged as well as carrying in/out the pallet by a stacker crane.

In this way, a rack may be used instead of a fixed gear 19, and a pinion gear that moves linearly along a rack may be used instead of a pivoting gear 32, so that a straight moving frame in place of a pivoting frame 13 is linearly moved.

REFERENCE SIGNS LIST

1: machine tool body
2: automatic pallet changer
11: pallet storage section
12: carry-in/out arm
13: pivoting frame (horizontal moving frame)
14: lifting frame
15: pivoting/carry-in/out drive unit
16: lifting drive unit
17: base frame
19: fixed gear
20: planetary reduction gear
23: first fix]ing means
24: second fixing means
25: first output shaft
26: second output shaft
27: Casing
32: pivoting gear (first rotating gear)
43: rack
44: spline shaft drive gear (second rotating gear)
45: spline shaft
46: spline shaft driven gear (third rotating gear)
47: spline nut
48: pinion gear
51: cylinder
52: piston
53: piston fitting hole
54: cylinder
55: piston
56: block
56a: piston inlet hole
P: pallet

The invention claimed is:

1. An automatic pallet changer in a machine tool, comprising:
    a pallet storage section for storing pallets in multiple rows and multiple stages;
    a carry-in/out arm that supports one of the pallets and moves in back and forth directions for carrying in and out the one pallet to and from the pallet storage section;
    a horizontal movement frame that moves horizontally for moving the carry-in/out arm to a front of a predetermined row of the pallet storage section;
    a lifting frame that moves in up and down directions for moving the carry-in/out arm to a front of a predetermined stage of the pallet storage section; and
    a drive unit for driving the carry-in/out arm, the horizontal movement frame, and the lifting frame,
    wherein the drive unit includes a planetary reduction gear having a first output shaft and a second output shaft configured such that each of the first and second output shafts are configured to be selectively fixed, such that by fixing one of each of the first and second output shafts, the other of the second and first output shaft functions as an output shaft for driving,
    wherein each of the first and second output shafts has a rotational axis extending in up and down directions, and the first output shaft is used to move the horizontal movement frame horizontally and the second output shaft is used to move the carry-in/out arm in the back and forth directions.

2. The automatic pallet changer in machine tool according to claim 1, wherein a first rotating gear fixed to the first output shaft of the planetary reduction gear is configured to move integrally with the horizontal movement frame and is engaged with a fixed gear fixed to a base frame or is engaged with a rack fixed to a base frame, and, when the first rotating gear rotates, the first rotating gear and the horizontal movement frame move horizontally integrally.

3. The automatic pallet changer in machine tool according to claim 1, wherein a rotating gear fixed to the second output shaft of the planetary reduction gear is engaged with a further rotating gear that is fixed to a spline shaft having a longitudinal axis extending in up and down directions,
    a pinion gear is integrally disposed at the outer circumference of a spline nut fitted to the spline shaft,
    a rack engaged to the pinion gear and extending in the back and forth directions is fixed to the carry-in/out arm, and
    when the rotating gear that is fixed to the second output shaft rotates, the further rotating gear, the spline shaft, the spline nut and the pinion gear rotate integrally, so that the rack and the carry-in/out arm move in the back and forth directions integrally.

4. The automatic pallet changer in machine tool according to claim 1, wherein a means for fixing the first output shaft is formed by a piston horizontally movably supported by a cylinder fixed to the horizontal movement frame, and is also formed by a piston inlet hole provided in a block fixed to a base frame, into which piston inlet hole a distal end portion of the piston is fitted.

5. The automatic pallet changer in machine tool according to claim 1, wherein a means for fixing the second output shaft is formed by a piston movably supported in the up and down directions by a cylinder fixed to a casing that is for supporting the planetary reduction gear, and is also formed by a piston inlet hole provided in a rotating gear fixed to the second output shaft, into which piston inlet hole a distal end portion of the piston is fitted.

* * * * *